United States Patent Office 3,809,705
Patented May 7, 1974

3,809,705
PROCESS FOR THE DEACYLATION OF AROYL-AMINO-DIANTHRIMIDES
Arnold Wick, Therwil, Switzerland, assignor to Ciba-Geigy AG, Basel, Switzerland
No Drawing. Filed July 15, 1971, Ser. No. 165,761
Claims priority, application Switzerland, July 17, 1970, 10,934/70
Int. Cl. C09b 1/48
U.S. Cl. 260—367          4 Claims

ABSTRACT OF THE DISCLOSURE

A process for the manufacture of amino-dianthrimides, wherein aroylamino-dianthrimides are acted upon by sulphuric acid in the presence of boric acid.

---

It is known that acylamino-anthraquinone derivatives, when acted upon by strong acids, can be split to form the corresponding aminoanthraquinone derivatives. Treatment with 80 to 98% sulphuric acid or concentrated phosphoric acid at temperatures in the region of 100° C. has proved effective as the general method of splitting benzoyl-aminoanthraquinone derivatives [cf. Houben Weyl "Methoden der organischen Chemie," nitrogen compounds II, p. 931 (Georg Thieme Verlag, Stuttgart, 1957)].

Thus for example, the corresponding diamino-dianthramide carbazoles are obtained by heating the 4,4'-, 4,5'-dibenzoylamino-1,1'-dianthrimide carbazoles in concentrated sulphuric acid. Furthermore, German Pat. 491,428 describes the partial saponification of 4,5'-dibenzoylamino-1,1'-dianthrimide carbazole by carefully treating it in concentrated sulphuric acid at room temperature to give the 5'-amino-4-benzoyl-amino-1,1'-dianthrimide carbazole.

These methods, however, are of no avail when it is a question of splitting acylaminoanthraquinone derivatives which, on being treated with an acid, are subject to cyclization reactions to form, for example carbazole or coeramidonine derivatives. Thus it is impossible, for example, to saponify the 4,4'-, 4,5'-, or 5,5'-dibenzoylamino-1,1'-dianthrimides, which are the basis of the above mentioned dibenzoylamino-dianthrimide carbazoles, by using the known methods to form the corresponding diamino-dianthrimides, since in the process cyclization reactions simultaneously occur.

It has now been surprisingly discovered that by avoiding the above cited undesirable cyclization reactions, amino-dianthrimides can be obtained easily when aroylamino-dianthrimides are acted upon by sulphuric acid in the presence of boric acid.

The starting materials used according to the invention contain as aroylamino groups especially benzoylamino groups; and these latter may be substituted, for example, by halogen atoms, alkyl or alkoxy groups.

In carrying out the process according to the invention, particular interest attaches to benzoylamino-dianthrimides of the formula

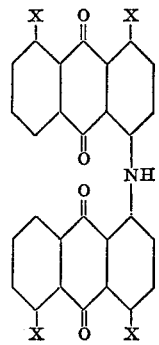

in which two of the substituents X represent benzoylamino groups, and the others represent hydrogen atoms.

As examples there may be cited:

4,4'-dibenzoylamino-1,1'-dianthrimide,
4,5'-dibenzoylamino-1,1'-dianthrimide,
5,5'-dibenzoylamino-1,1'-dianthrimide.

The composition and the amount of the sulphuric acid-boric acid mixture used for the splitting process can be varied within wide limits; however, the mixture should contain at least the equivalent of boric acid necessary for a 1:1 complex formation with the acylamino-anthraquinone derivative, but desirably an excess, for example 1 part of boric acid per part of acylamino-anthraquinone derivative. The amount of concentrated sulphuric acid is so chosen that a reaction mixture is formed that can be well stirred advantageously about 5 to 20 parts by volume of sulphuric acid per part of acylamino-anthraquinone derivative.

Instead of boric acid, it is also possible to add alkali borates such, for example, as sodium tetraborate, to the sulphuric acid.

Advantageously, the procedure to be followed is that the boric acid is introduced initially into the ready prepared sulphuric acid and dissolved as far as possible while stirring at room temperature. The acylamino-anthraquinone derivative is then added and the reaction carried out at the chosen temperature. If the reaction temperature is close to room temperature, it is frequently advantageous to add the acylamino-anthraquinone derivative while cooling and subsequently to allow the mixture to warm to room temperature. In general, the splitting takes place at room temperature or moderately elevated temperature in the range of 25 to 60° C. and desirably under 100° C.

For processing, the reaction mixture is poured into ice water. If in the process a stable boric acid complex results, this can be decomposed prior to the further isolation of the amino derivative by heating or by adding alkali until alkaline reaction occurs, using phenolphthalein as indicator.

The resulting amino-dianthrimides, especially the di-amino-dianthrimides, constitute valuable and very largely new intermediates for the manufacture of vat dyestuffs, pigments or disperse dyestuffs.

Due to their heat resistance, they are also suitable for coloring high-melting spinnable materials, such as polyolefines, polyesters and polyamides.

The success of the process according to the invention is surprising, since the deacylation takes place under conditions in which in the absence of boric acid cyclization occurs without the acyl radical being split off. It is assumed that the acylamino-anthraquinones used as starting materials form complex compounds with the sulphuric acid-boric acid mixture which are not subject to cyclization.

The following examples illustrate the invention, the parts and percentages being by weight unless otherwise stated.

EXAMPLE 1

16.5 parts of 5,5'-dibenzoylamino-1,1'-dianthrimide are introduced into a solution of 25 parts of boric acid in 250 parts by volume of concentrated sulphuric acid at room temperature and the reaction mixture is stirred for 24 hours. The dark blue solution is poured into 2500 parts of ice water and stirred for 30 minutes. The precipitated violet red product is collected by suction filtration, washed with water until a weakly acid reaction occurs, and stirred again in 500 parts of warm water having a temperature of 50 to 60° C. Sodium carbonate is added until the reaction is alkaline, using phenolphthalein as detector. The alkaline solution is stirred briefly, the product collected once more by suction filtration, washed until neutral and dried. 10.5 parts of dark red 5,5'-diamino-1,1'-dianthrimide with a greenish metallic surface gloss are obtained and which dissolves pale olive in concentrated sulphuric acid. Recrystallization from o-dichlorobenzene yields small red needles that dissolve colorless in concentrated sulphuric acid.

In the melt spinning process the dyestuff colors polyester and polypropylene in powerful copper red shades and polyamides in claret shades possessing good fastness properties.

EXAMPLE 2

In accordance with the particulars stated in Example 1, 16.5 parts of 4,4'-dibenzoylamino-1,1'-dianthrimide are reacted for 6 hours at 40 to 45° C. On pouring the blue green sulphuric acid-boric acid solution into ice water a dark blue suspension is obtained, the further processing of which leads to 11 parts of the dark blue 4,4'-diamino-1,1'-dianthrimide. This product dissolves blue in concentrated sulphuric acid and in a thin-layer chromatogram (silica gel/chloroform) shows a unitary, greenish-blue spot that has the same $R_f$ value as authentic material prepared by nitrating and reducing 1,1'-dianthrimide.

In the melt spinning process, the dyestuff colors polypropylene and polyester in powerful blue green shades and polyamides in similar shades possessing good fastness properties.

EXAMPLE 3

16.5 parts of 4,5'-dibenzoylamino-1,1'-dianthrimide are reacted in the manner described in Example 1. On pouring the dark, greenish sulphuric acid-boric acid solution into ice water a dark violet suspension is obtained, the further processing of which leads to 11.5 parts of the dark violet blue 4,5'-diamino-1,1'-dianthrimide. This product dissolves blue green in concentrated sulphuric acid and in thin-layer chromatogram shows a unitary violet blue spot.

In the melt spinning process the dyestuff colors polyesters in powerful grey violet shades and polyamides and polypropylene in neutral grey shades possessing good fastness properties.

EXAMPLE 4

98 parts of polyethylene terephthalate chips are coated in dry form with 2 parts of a preparation consisting 50% of 5,5'-diamino-1,1'-dianthrimide and 50 parts of magnesium behenate. The coated chips are fused at approx. 285° C. according to the usual process and spun into fibres. The fibres have a uniform copper red shade with good fastness properties.

EXAMPLE 5

98 parts of polyamide-6 chips are coated in dry form with 2 parts of a preparation consisting 50% of 5,5'-diamino-1,1'-dianthrimide and 50 parts of magnesium behenate. The coated chips are fused at approx. 285° C. according to the usual process and spun into fibres. The fibres have a uniform wine red shade with good fastness properties.

What I claim is:

1. A process for the manufacture of amino-dianthrimide wherein a benzoylamino-dianthrimide of the formula

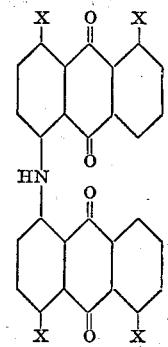

in which two of the substituents X represents benzoylamino groups, and the others represent hydrogen, is acted upon by sulphuric acid in the presence of at least an equivalent amount of boric acid necessary for a 1:1 complex formation with said benzoylamino-dianthrimide.

2. The process of claim 1, wherein 80 to 100% sulphuric acid, or sulphuric acid containing 0 to 10% sulphur trioxide, is used.

3. The process of claim 2, wherein 90 to 100% sulphuric acid is used.

4. The process of claim 1, wherein the process is carried out at temperatures between 25 to 60° C.

References Cited

Lubs, The Chemistry of Synthetic Dyes and Pigments, pp. 460–464 (1955).

LORRAINE A. WEINBERGER, Primary Examiner

E. J. SKELLY, Assistant Examiner

U.S. Cl. X.R.

8—39; 260—37 NP, 37 P, 40 R, 40 P, 41 C